United States Patent [19]

Carlson

[11] Patent Number: 5,074,011
[45] Date of Patent: Dec. 24, 1991

[54] STRAP LOCK FOR ADJUSTING LOOPS
[75] Inventor: Bertyl W. Carlson, Richfield, Minn.
[73] Assignee: Alpha-M, Inc., Minneapolis, Minn.
[21] Appl. No.: 525,893
[22] Filed: May 18, 1990
[51] Int. Cl.$^5$ .......................... A44B 11/00; B68B 1/02
[52] U.S. Cl. ........................................ 24/170; 24/191; 54/24
[58] Field of Search ................ 24/170, 191, 193, 194, 24/68 CD, 68 E, 69 ST; 54/24, 15; 119/130

[56] References Cited

U.S. PATENT DOCUMENTS

| 40,911 | 12/1863 | Cowles | 24/170 |
| 391,713 | 10/1888 | Hohenstein | 24/170 |
| 632,793 | 9/1899 | Sell et al. | 24/170 |
| 950,434 | 2/1910 | Carlson | 24/170 |
| 1,360,937 | 11/1920 | Guyot | 24/170 |
| 3,319,308 | 5/1967 | Williams | 24/170 |
| 4,741,288 | 5/1988 | Anderson et al. | 54/130 |
| 4,881,303 | 11/1989 | Martini | 24/170 |
| 4,941,313 | 7/1990 | Anderson et al. | 54/24 |

FOREIGN PATENT DOCUMENTS

| 192159 | 11/1956 | Austria | 24/170 |
| 1204470 | 1/1960 | France | 24/170 |
| 1411137 | 8/1965 | France | 24/170 |

Primary Examiner—Victor N. Sakran

[57] ABSTRACT

A strap lock device has a base and sidewalls that receive a strap and a pivoting lock plate mounted on the sidewalls for engaging a strap held on the base to prevent sliding of the straps. A cam is provided to be operable to bear on and lock the locking plate down against a strap. The cam has a lever that permits one hand operation to quickly release the lock for adjustment.

4 Claims, 2 Drawing Sheets

STRAP LOCK FOR ADJUSTING LOOPS

BACKGROUND OF THE INVENTION

The present invention relates to a strap lock for adjustably positioning along two lengths of straps that are locked together. The strap lock is cam operated and has an intermediate lock plate that permits the cam to be much more easily operated than when a cam acts directly against straps. Strap loops formed are easily and quickly adjusted with the present device.

Various strap locks have been used in the prior art. Easily operated and reliable locks are needed. A quick acting lock for adjusting the muzzle loop of a training head collar such as that shown in U.S. Pat. No. 4,741,288, issued May 3, 1988 is very desirable. One type of such adjustable lock is shown in U.S. application Ser. No. 07/223,157. The present strap lock is illustrated in connection with such a training collar. The present lock is suitable for use with such a collar because it is very small, very easily operated, but yet provides a positive holding force. This makes the adjustment of the muzzle loop easily and quickly done when the need arises.

SUMMARY OF THE INVENTION

The present invention relates to a slide locking device for use with straps, to permit adjusting the position of the locking device along the straps and in particular to simplify the adjustment of a loop formed from a single strap particularly easy. The slide locking device can be used on an adjustable muzzle loop for example, but it can also be used for locking various items together in a positive way.

The slide locking device comprises a housing that receives one or more lengths of strap, through a passageway that is formed by a base of the locking device, and a pivoting plate that overlies the strap or straps on the base. A cam also is mounted on the locking device housing and is then operated to act against the plate and force the plate against the straps to hold them positively relative to the slide locking housing base. When a loop is formed so two strap lengths are utilized, a very positive force can be generated for securing the loop and preventing the loop from changing in size (particularly from expanding). Yet the cam can be easily operated to release the pivoting lock plate relative to the base and permit the loop to be changed in size when desired.

The slide locking device is easily molded from plastic parts, and then assembled to form a low cost lock for easy adjustment of the loop size.

DETAILED DESCRIPTION OF THE PREFERRED EMBODIMENTS

Figure 1:
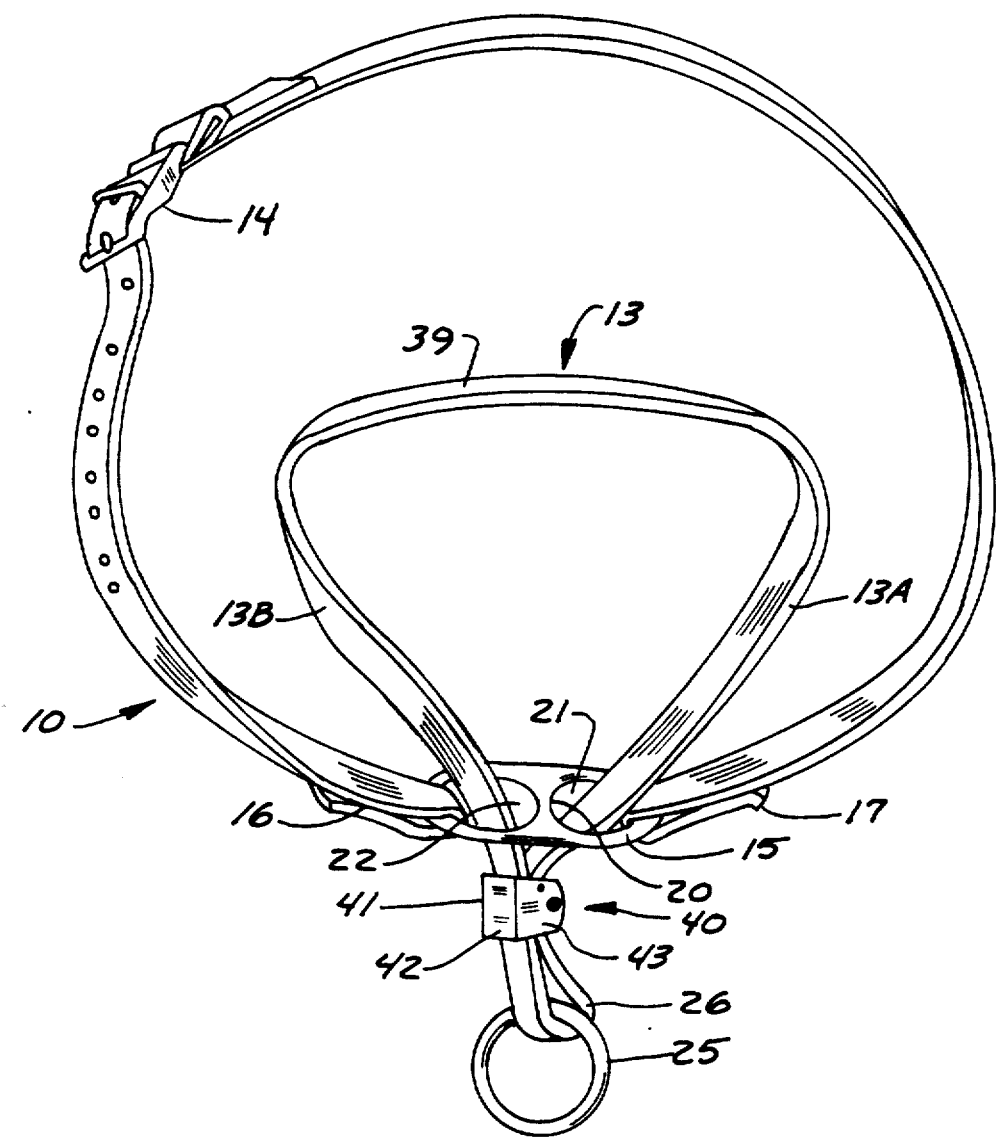
FIG. 1 is a perspective view of a training head collar and muzzle loop used for training animals such as dogs, and having a slide locking device made according to the present invention installed thereon.

In FIG. 1, a training aid for dogs is illustrated generally at 10 and reference to U.S. Pat. No. 4,741,288, issued May 3, 1988, will show such a training aid on a dog for easier understanding. The training aid 10 includes a collar 12, and a muzzle loop 13. An adjustable fastener 14 is used for changing the size of the collar, and a connecting ring 15 is used for holding two portions of the collar together. The connecting ring 15 permits two side strap sections 16 and 17 of the collar to be held in opposite sides of the ring. The ring 15 is an oval ring that has a center divider bar 20 to form two side openings 21 and 22.

The muzzle loop 13 is a continuous loop of suitable material which can be a synthetic or Nylon woven material that has strap lengths 13A and 13B that pass through the openings 21 and 22 in the ring 15. The strap lengths are freely slidable in the two side openings, and a snap receiving ring 25 can be utilized at the lower portion 26 of the muzzle loop so that a leash can be attached.

The collar is placed on a dog, and the muzzle loop 13 is placed over the muzzle. The training aid permits control of the animal by providing controlling pressure when the ring 25 is pulled. When the muzzle loop is permitted to loosen by releasing pressure on the leash, the loop can then be expanded to the extent permitted by the slide locking device 40 which is fastened to the strap sections 13A and 13B below the ring 15. The slide locking device 40 permits adjusting the size of the muzzle loop that is above the ring 15, and thus permits adjusting the amount of clearance that the loop has relative to the muzzle of the dog.

Figure 4:
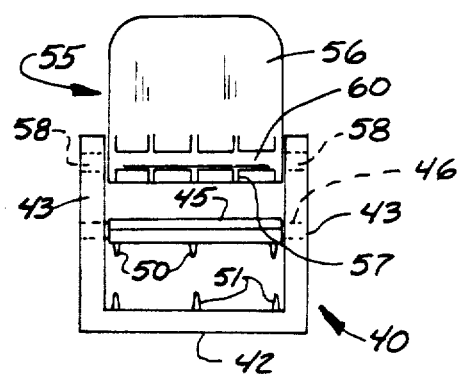
FIG. 4 is a front elevational view taken as on line 4—4 in FIG. 3.

The slide locking device comprises a housing 41 that, as shown in FIG. 4, has a base plate 42, and a pair of upstanding sidewalls 43,43, that are spaced apart a desired amount substantially equal to, but slightly greater than the width of the strap sections 13A and 13B that are to be held. The upstanding sidewalls 43 are used for pivotally mounting a lock plate 45 therebetween. The lock plate 45 is a flat piece of material that has pivot pins 46 (FIG. 4), pivotally mounted on apertures on the upright members 43, adjacent the inlet end or rear end of the housing 41. The pins 46 are near one edge of the lock plate and protrude from opposite sides of the plate 45.

Figure 2:
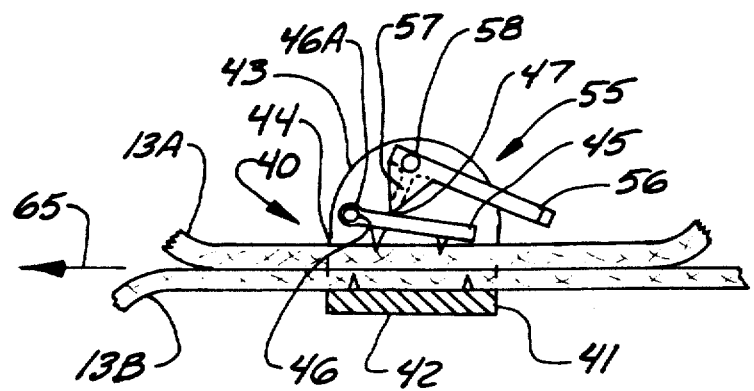
FIG. 2 is a side elevational view of the straps forming the muzzle loop of FIG. 1 with the slide locking device of the present invention shown in cross section.
Figure 3:
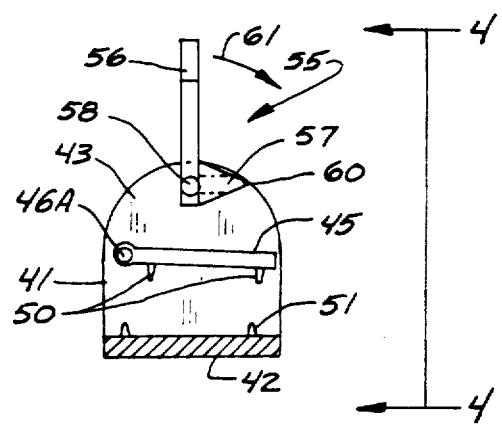
FIG. 3 is a sectional view taken as on substantially the same line as FIG. 2, with the slide locking device in an open position and without the straps shown.

The pivot point for the pins 46 is shown at 46A in FIGS. 2 and 3. The lock plate 45 is freely pivoting, and has a plurality of sharp teeth or projections 50 extending therefrom which will tend to engage the strap sections 13A and 13B that are in the locking device. The base wall 42 also has teeth 51 extending upwardly to engage the other strap section and provide for a positive locking force.

The lock plate 45 is operated through a cam operator indicated at 55. The cam operator comprises a lever plate 56, and a cam member 57 that are integrally molded together. The cam member 55 has suitable pins 58 (see FIG. 4) pivotally mounted near the upper portions of the sidewalls 43,43, so that the cam pivot axis indicated generally by the pins 58 in FIG. 3, is spaced from the lock plate 45, and on opposite side of the lock plate 45 from the base wall 42.

The cam member 57 has a cam end 60 that is slightly rounded, and as can be seen the cam tapers to have a wider base where it joins the lever plate 56. By pivoting the lever plate 56 in the direction as indicated by the arrow 61, the cam end 60 will come down and contact the lock plate 45, and as the lever plate 56 continues to be rotated, the cam member 57 will force the lock plate 45 to move about its pivot pins 43 toward the base wall 42. As shown in FIG. 2, can be put into a position where it goes over center and locks. The lock plate 45 in a position bearing against the strap sections 13A and 13B. The cam end 60, as can be seen, is over center with respect to a line perpendicular to the top of the plate 45 that passes through the axis of pivot of the pins 58.

This also causes the lock plate 45 to be over center with respect to forces that would tend to move the strap sections in direction as indicated by arrow 65. In other words, the lock plate 45 would tend to dig in and pivot down more tightly against the strap sections and force them more tightly against the base wall 42 if the loop was subjected to loads tending to make the loop larger or expand.

The locking device base could be anchored to a support, and used for holding one or more straps in position. It is easily adjustable by lifting up the cam lever and permitting the straps to move, or in the case of the preferred embodiment when the lock is used on a muzzle loop, by sliding the locking device relative to the straps.

Although the present invention has been described with reference to preferred embodiments, workers skilled in the art will recognize that changes may be made in form and detail without departing from the spirit and scope of the invention.

What is claimed is:

1. A locking device for adjustably holding two overlying aligned strap lengths of a loop relative to the locking device comprising:
   a housing defining a base wall for supporting a pair of overlying strap lengths, including a first strap length supported on the base wall and a second strap length supported on the first strap length;
   a plurality of sharp teeth projecting from the base wall toward the first strap length;
   a pair of sidewalls for containing the strap lengths;
   a lock plate pivotally mounted about a first pivot axis relative to the sidewalls, and pivotal to engage the second strap length supported on said first strap length and the base wall;
   a plurality of sharp teeth projecting from the lock plate toward the second strap length; and
   cam locking means supporting by said sidewalls at a location different from the first pivot axis and comprising an over center cam lock engaging the lock plate for locking the lock plate firmly against the second strap length to force the teeth on the lock plate into the second strap length and to force the first and second strap lengths toward the base wall and the teeth on the base wall into the first strap length.

2. The locking device of claim 1 wherein said cam locking means comprises a cam member and a lever fixed to the cam member, said cam member and said lever being pivoted about a pivot axis spaced above the lock plate with respect to the base, the lever having an actuator end extending laterally beyond the side walls for access for operation.

3. The locking device of claim 1 wherein said lock plate is mounted about a pivot axis spaced above strap members on the base and having an end to engage such straps spaced away from its pivot axis to tend to pivotally tighten toward the base as supported strap lengths are loaded in a first direction.

4. The locking device of claim 1 wherein the strap lengths extend along the base wall in a longitudinal direction, and wherein the teeth on the base wall and the teeth on the lock plate are offset from each other in the longitudinal direction.

* * * * *